UNITED STATES PATENT OFFICE.

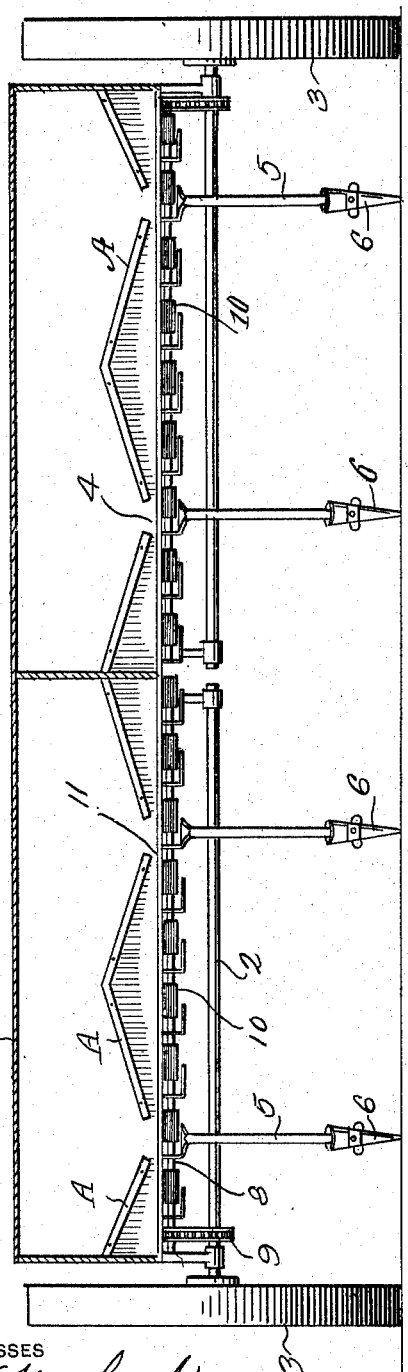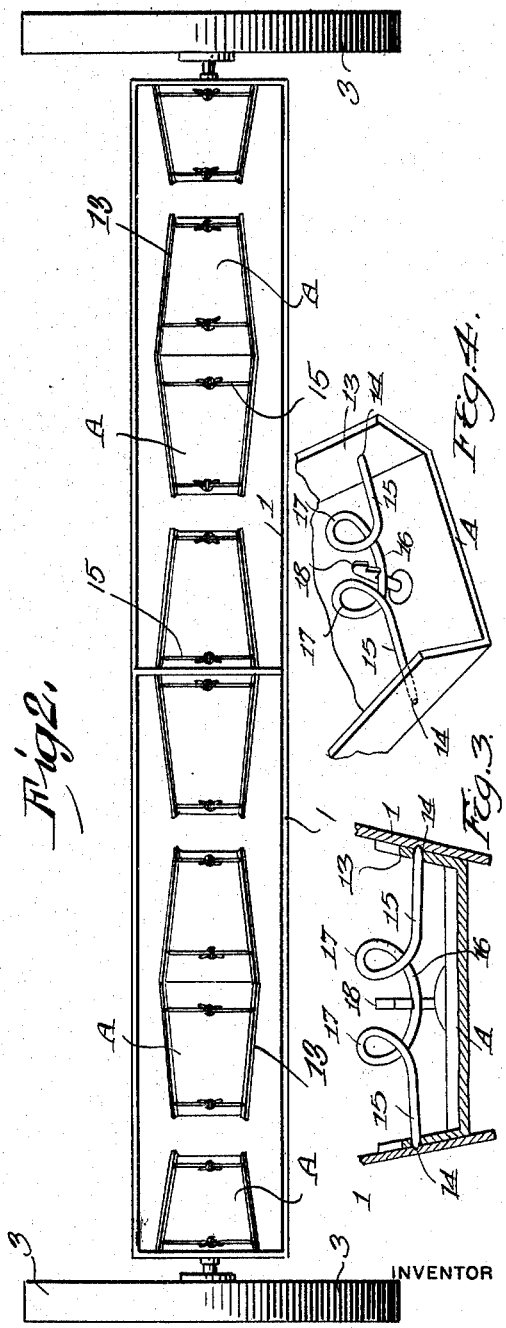

HERBERT NELSON, OF HARPTREE, SASKATCHEWAN, CANADA.

GRAIN-DRILL.

1,308,252.  Specification of Letters Patent.  Patented July 1, 1919.

Application filed May 24, 1918. Serial No. 236,383.

*To all whom it may concern:*

Be it known that I, HERBERT NELSON, a subject of the King of Great Britain, residing at Harptree, in the Province of Saskatchewan and Dominion of Canada, have invented certain new and useful Improvements in Grain-Drills, of which the following is a specification.

The invention has relation to agricultural machinery, and more particularly to planters of the type specially designed for sowing seed in drills, the purpose being to adapt a grain drill so that it may be used in the ordinary way for sowing grain in rows about six inches apart or in rows approximately two feet six inches apart, or at such distances as to provide for ready cultivation or the passing between the rows for weeding.

It has been determined by practical tests that for fall and spring sowing, the best results are obtained by sowing the grain in rows spaced apart a distance to admit of cultivation and the free passage between the rows to admit of the removal of weeds and other objectionable growth. Grain and more particularly wheat raised in this manner attains a vigorous growth and produces strong plants which develop large and heavy heads and kernels of good size and moreover, the plants are not affected by drought in a dry season or in sections of the country where dry seasons are experienced.

In accordance with the invention, a grain drill is adapted to have certain drills disconnected, and the discharge openings cooperating therewith are protected by covers which prevent the waste of grain and insure the positive delivery of the grain to the remaining drills, so that the required amount of grain is positively delivered in the widely spaced rows.

The invention contemplates the provision of covers which may be easily and quickly placed in position or removed as required, and which will not necessitate any special change in the structure of the drill to adapt the same for planting the grain in relatively wide separated rows.

The drawing illustrates a preferred embodiment of the invention; however, it is to be understood that in adapting the same to meet different conditions, various changes in the form, proportion, and minor details of construction may be resorted to without departing from the nature of the invention as claimed hereinafter.

In the drawing:

Figure 1 is a transverse section through the hopper of a grain drill showing the application of the invention thereto.

Fig. 2 is a top plan view of the parts illustrated in Fig. 1.

Fig. 3 is a detail perspective view of a portion of one of the covers for extending over the grain outlets of the hopper.

Fig. 4 is a sectional detail of the hopper and a cover in position therein.

Corresponding and like parts are referred to in the following description and indicated in all the views of the drawing by like reference characters.

The grain drill illustrated is of ordinary construction and comprises a hopper 1, axle 2, and ground wheels 3, the latter being connected with the axle 2 by the ordinary ratchet and pawl whereby provision is had for the rotating of one wheel faster than the other as when turning when reaching the end of a row.

The hopper 1 has its front and rear walls downwardly converging and its bottom provided with the usual outlets 4 for the grain, said outlets being spaced approximately six inches apart to admit of drilling in the manner well understood. The numeral 5 designates the usual grain tubes and 6 the furrow openers whereby the ground is opened for reception of the grain. The furrow openers 6 may be of any type and are adapted to be connected with the front portion of the frame by means of braces 7 as indicated most clearly in Fig. 3. These parts are of well known construction and it is not deemed necessary to describe the same in detail.

A shaft 8 parallels the axle 2 and is connected therewith by suitable gearing so as to be driven thereby. As indicated a sprocket chain 9 connects sprocket wheels attached to the axle and shaft so as to transmit movement from the axle to the shaft. A plurality of feeders 10 are secured on the shaft 8 so as to rotate therewith, one of such feeders being provided with each grain outlet in a manner well understood. The grain outlets are adjusted by means of a cut-off 11 which is moved by means of a lever which coöperates with a scale in the usual way. Movement of the lever effects the shifting of the cut-off 11 whereby the effective size of the grain outlets 4 is regulated according to the nature of the grain to be planted.

When the drill is adapted for sowing seed in relatively widely separated rows, intermediate openers and grain tubes are removed, and certain grain tubes and openers are left in position, the same corresponding to the distance apart of the rows to be planted. In order to prevent the escape of grain through the outlets 4 between the outlets corresponding with the grain tubes and openers remaining, it is necessary to cover such intermediate grain outlets and for this purpose, covers of the nature indicated most clearly in Fig. 3 are provided, such covers being preferably constructed of sheet metal having their longitudinal edge portions bent in the same direction so as to engage the front and rear walls of the hopper to which the covers are attached. The covers are disposed so that they incline upwardly and outwardly from the grain opening through which the grain is to be delivered thereby insuring a positive feed of the grain and preventing the lodging of the grain if the covers were disposed in a horizontal plane. It should be remembered that the front and rear walls of the hopper are upwardly diverged and that the covers are inclined to the horizontal, hence such covers taper throughout their length as indicated most clearly in Fig. 2. The ends of the covers contiguous to the grain outlet are smaller than the ends remote from the grain outlet, and this is due to the relative disposition of the parts as herein stated.

The covers are indicated generally by the reference letter A and each of such covers comprises a main portion 12 and side portions 13. The cover being preferably constructed of sheet metal has longitudinal edge portions of the metal blank bent upwardly at a right angle to form the parts 13 which engage the front and rear walls of the hopper and which also serve to stiffen and brace the cover longitudinally. Openings 14 are formed in the upstanding portions 13 of the cover to receive fastening means whereby the cover is made secure when in position.

As shown most clearly in Figs. 3 and 4, the fastening means for the cover comprise oppositely disposed elements 15 which are pointed and are adapted to pass through the openings 14 and engage the front and rear walls of the hopper. The fastening elements or catches 15 preferably constitute parts of a single length of spring wire which is doubled upon itself to provide the part 16, the folded portions being bent to provide the spring loops 17 which are disposed to extend upwardly. When the pointed ends of the catches 15 are disposed in register with the openings 14, a downward pressure is exerted upon the loops 17, the pointed ends of the catches being projected and caused to engage with the front and rear walls of the hopper. To hold the fastening in operative position, the cover is provided with a ratchet post 18 which projects vertically therefrom intermediate of the upstanding portions 13 and the teeth of such post engage the intermediate portion 16 of the fastening member. When the part 16 is disengaged from the teeth of the ratchet post 18, the fastening member contracts thereby withdrawing its pointed ends from the walls of the hopper so that the cover may be removed.

When the drill is to be operated in the ordinary way for sowing grain in rows spaced apart about six inches, more or less, all the grain tubes and openers are left in position and the covers A are removed. When the drill is adapted for sowing grain in rows approximately two feet six inches apart more or less intermediate grain tubes and furrow openers are removed and the covers are placed in position so that the drill will appear substantially as indicated in Figs. 1 and 2 of the drawing. When the grain is sowed in rows widely separated, the plants may be cultivated and the farmer may work between the rows and remove weeds and other objectionable growth. Grain sowed in this manner is not susceptible to drought and results in vigorous and hardy plants which produce large heads and well developed kernels.

What I claim is:

1. In a grain drill hopper having its front and rear walls upwardly diverged, and a plurality of outlets in its bottom, covers disposed within the hopper and covering certain grain outlets, the covers adjacent the grain outlets left exposed inclining upwardly and outwardly and gradually tapering from their lower toward their upper ends, and means for securing the covers to the walls of the hopper.

2. In a grain drill hopper, a cover for closing certain grain outlets, fastening means for securing such cover in position, the same comprising oppositely disposed catches, an intermediate connecting portion, and spring loops, said fastening when subjected to pressure lengthening to project the active extremities of the catches into operative position.

3. In combination with a grain drill hopper, a cover for closing certain grain outlets thereof, a ratchet post connected with the cover, and a fastening for securing the cover in position, the same comprising oppositely disposed catches, an intermediate connecting portion, and spring loops, the intermediate connecting portion being disposed to coöperate with the ratchet post.

4. In combination with a grain drill hopper and a cover for closing certain grain outlets thereof, the same comprising a main portion and upstanding side portions having openings therein, a ratchet post connected with the cover, and a fastening comprising oppositely disposed catches, an intermediate connecting portion, and spring loops.

In testimony whereof I affix my signature in presence of two witnesses.

HERBERT NELSON.

Witnesses:
 HAROLD ALLEN,
 HERBERT HARKNESS.

Copies of this patent may be obtained for five cents each, by addressing the "Commissioner of Patents, Washington, D. C."